United States Patent Office 2,959,620
Patented Nov. 8, 1960

2,959,620

FLUOROCARBON PHOSPHINO BORINES

Anton B. Burg and Gottfried Brendel, Los Angeles, Calif., assignors, by mesne assignments, to American Potash & Chemical Corporation, a corporation of Delaware No Drawing. Filed June 5, 1957, Ser. No. 663,623

8 Claims. (Cl. 260—606.5)

This invention relates in general to the preparation of trifluoromethylphosphinoborine polymers and more particularly to the preparation of such polymers through the action of boron hydride (diborane) upon trifluoromethylphosphine materials.

Most of the materials used in the preparation of polymers or plastics are organic in nature and in some instances display unsatisfactory chemical and thermal stability.

It is therefore an object of this invention to provide a method for synthesizing certain phosphinoborine polymers, a group of basically inorganic polymers having extreme chemical and thermal stability.

Still another object of this invention is to provide a method for the preparation of trifluoromethylphosphinoborine polymers through the action of diborane, $B_2H_6$, upon certain trifluoromethylphosphine materials.

Ancillary objects and advantages of this invention if not specifically set out will become apparent during the course of the discussion which follows.

Broadly, it has been found that fluorocarbon-phosphorus groups may be attached to boron through the action of diborane, $B_2H_6$, upon phosphines such as $(CF_3)_2PF$ and $(CF_3)_2PH$, the reaction preferably taking place at about room temperature or slightly above and preferably under pressures of from two to seven atmospheres. Extremes of 0° C. to 75° C. can be sometimes used, though the lower temperatures necessitate increased pressures if the process is not to be unreasonably slow. Generally, increased pressures and temperatures increase the reaction rate and the upper limits approach those at which diborane decomposes.

More particularly, it has been found that fluorocarbon-phosphinoborine polymers having the general formula $[(CF_3)_2PBH_2]_n$ where $n$ is an integer indicative of the degree of polymerization may be formed by the action of diborane, $B_2H_6$, upon compounds of the general formula $(CF_3)_2PX$ where X is either fluorine or hydrogen. Mixtures of these two phosphine materials may be used with equal success. Because of the fact that diborane decomposes at fairly moderate temperatures, it is preferred to effect the reaction at temperatures less than about 75° C. Accordingly, in order to speed the reaction it is preferred to increase the pressure, pressures of as high as seven atmospheres being suitable. Temperatures less than about 25° C. are not preferred as the reaction at such temperature becomes unreasonably slow. Particularly effective conditions are room temperature (25° C.) to about 50° C. and pressures of about four to seven atmospheres. Under such conditions, the reaction is complete in ten days or slightly less.

The product of this invention, predominantly the trimer of $(CF_3)_2PBH_2$, has a high degree of stability and also has a higher degree of thermal stability than most boron hydrides or their derivatives. Even at 200° C. this new phosphinoborine is only slowly destroyed, all of the boron coming out as $BF_3$. The product therefore finds utility under circumstances where extreme temperatures are present and where a high resistance to further chemical reaction is desired. The reaction product of the invention is a crystalline substance which melts to an oily liquid and is volatile enough for investigation by high-vacuum methods. A less volatile component is composed primarily of the tetramer and higher polymers. These higher polymers may be used, as is the trimer, as hydraulic fluids under high temperature conditions.

Products prepared in accordance with the examples below have been characterized through the use of the immersible tensimeter for ascertaining vapor density, thereby giving a molecular weight of 541, that calculated for $[(CF_3)PBH_2]_3$ being 545.5.

Examples as set forth below of the preparation of the product of this invention are to be construed as illustrative solely and are not to be interpreted as placing limitations upon the scope of the invention other than those set forth in the appended claims.

EXAMPLE I

The necessary $(CF_3)_2PF$ was prepared by first obtaining a mixture of $(CF_3)_3P$, $(CF_3)_2PI$ and $CF_3PI_2$ according to the Bennett-Emeleus-Haszeldine method as set out in J. Chem. Soc. 1953, 1565. The $(CF_3)_3P$ was isolated and purified by fractional distillation in the high-vacuum apparatus. The iodides were converted to fluorides by reaction with antimony trifluoride as follows:

A 3.52 gm. sample of $(CF_3)_2PI$ was allowed to react with 2.6 gm. of $SbF_3$ at room temperature during 22 hours, giving an almost quantitative yield of $(CF_3)_2PF$. The remaining gas mixture consisted of minor by-products of similar volatility. From these, $P_2(CF_3)_4$ was isolated and identified (M.W. 338; calcd., 338.0; vapor tensions checked).

The reaction of 3.72 gm. of $CF_3PI_2$ with 4.5 gm. of $SbF_3$ was far slower, reaching only 70 percent completion during 48 hours in a sealed tube at 50° C. Both fluorides were well purified by fractional distillation in the high-vacuum apparatus. The molecular weight of the $CF_3PF_2$ was measured as 137.8 (calcd., 138.0) and its volatility agreed closely with earlier results.

A mixture of 1.24 mmols of $B_2H_6$ and 7.924 mmols of $(CF_3)_2PF$ was allowed to stand for ten days at room temperature in a sealed 24 ml. Pyrex tube. During that time the diborane was wholly consumed, but not in the sense of mere complex-formation. The noncondensable gas (presumably hydrogen) amounted to 0.705 mmol, and it was also possible to isolate 1.423 mmols of $BF_3$ (M.W. 67.6; calcd. 67.8; obsd. M.P. —131°; known, —128° C.; vapor tensions checked). No doubt there was some unused $(CF_3)_2PF$, but it has not been isolated from $(CF_3)_2PH$, a product of similar volatility.

The reaction yielded also some difficultly volatile products, including 87.4 mg. of a crystalline substance which melted to an oily liquid at approximately 23.2° C. This was volatile enough for fuller investigation by high-vacuum methods, and proved to be the new and somewhat unexpected trimer. $[(CF_3)_2PBH_2]_3$. A still less volatile component containing the tetramer and higher polymers remained.

The hydrolysis of 58.6 mg. of this product in 5 ml. of 10 percent aqueous sodium hydroxide, during 24 hours at room temperature, yielded 0.316 mmol of $HCF_3$ (M.W. 69.2 vs, calcd. 70.0; vapor tensions checked), corresponding to 2.94 $CF_3$ groups per mol of $(CF_3)_6P_3B_3H_6$. This accords well with the fact that the expected $(CF_3)_2PH$ hydrolyzes in basic solution to form one $HCF_3$ per mol. The acidified solution gave off no hydrogen, and it can be understood that all B—H links would have been destroyed by acting to reduce the C—F links during the breakdown of the unrecovered $CF_3$ groups.

The trimer $[(CF_3)_2PBH_2]_3$ shows a high degree of thermal stability: it was hardly affected at all by heating in a sealed tube for 18 hours at 155° C. However, an 88.5 mg. sample (0.487 mmol of monomer) of this compound was heated for 10 days in a sealed tube at 200° C., yielding 0.117 mmol of hydrogen, 0.344 mmol of $BF_3$, 0.052 mmol of $HCF_3$, and 0.037 mmol of an unidentified gas. The recovery of the $[(CF_3)_2PBH_2]_3$ amounted to 25.5 mg., meaning that 71 percent of it had been destroyed. Thus it is clear that all of the boron in the destroyed phosphinoborine came out as boron trifluoride. Hence the brown wall-coating could contain only fluorocarbon, phosphorus, and hydrogen.

EXAMPLE II

The equation:

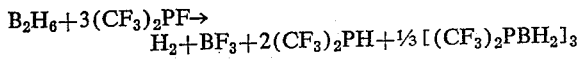
$$B_2H_6 + 3(CF_3)_2PF \rightarrow$$
$$H_2 + BF_3 + 2(CF_3)_2PH + \tfrac{1}{3}[(CF_3)_2PBH_2]_3$$

was reconfirmed by new experiments wherein all volatile products were quantitatively accounted for, with the implication that the non-volatile by-product consists mostly of higher polymers of the $(CF_3)_2PBH_2$ unit; however, there might be a trace of B-fluorinated material in the $(CF_3)_2PBH_2$ trimer and higher polymers. The four new experiments were run at three different temperatures in order to develop some idea of the effect of temperature upon rate; and in three of these experiments the products were investigated in mid-course as well as at the end. Thus it was possible to find at least good indications of some reaction intermediates, such as $(CF_3)_2PF \cdot BH_3$ and possibly fluoroborines such as $HBF_2$ or $H_2BF$. The main data of the four experiments are presented in Table I. Fuller details and conclusions drawn from these individual experiments are described infra.

action exists. Of special interest in relation to this experiment is the fact that the sum of the $B_2H_6$ and the $BF_3$ was much lower than expected (1.454 instead of 1.867) at the four-day point, but approached the calculated value when the reaction was approaching completion after 10 days. This effect suggested that the $(CF_3)_2PF$ might have formed the $BH_3$ adduct $BH_3 \cdot (CF_3)_2PF$ (the analogue of $BH_3CO$ and of $BH_3 \cdot PF_3$), without changing the volume of the gases shown in the final column of Table I; and since the formation of the $BH_3$ adduct would be highly reversible, this effect would fade out as the $(CF_3)_2PF$ is used up by the main reaction. Later experiments confirmed this hypothesis.

At 50° C. (experiment 3) the specific rate of the reaction evidently is at least ten times as fast as at room temperature (20–24° C.). In this experiment the diborane was above the 0.33 ratio required by the main equation, and accordingly some was available for the secondary reaction with $(CF_3)_2PH$. This evidently was extensive, for the final yield of $(CF_3)_2PH$ was only 80 percent of the expectation based upon conversion of two-thirds of the $(CF_3)_2PF$ to $(CF_3)_2PH$; and the deficiency of this fraction correlates fairly well with the excess $H_2$ (0.650 vs. 0.612 respectively). In the final analysis it was found that the phosphine fraction was essentially pure $(CF_3)_2PH$, as expected on the basis that the main reaction was complete. In this experiment as in the others, the fraction containing the $B_2H_6$ and the $BF_3$ ran low in the mid-course of the reaction, on account of capture of $B_2H_6$ in the far less volatile phosphine fraction.

As seen by the result of experiment 4, the reaction at 0° C. apparently was about half as fast as the runs at room temperature; and again here there was an apparent cap-

*Table 1*
The $B_2H_6$—$(CF_3)_2$ PF Reaction

| Expt. No. | Reactants (mmols) | | Temp., ° C. | Total Reaction Time (days) | Products and Recovered Reactants (mmols) | | | | |
|---|---|---|---|---|---|---|---|---|---|
| | $(CF_3)_2PF$ | $B_2H_6$ | | | $H_2$ | $[(CF_3)_2PBH_2]_3$ | $BF_3$ | $B_2H_6$ | $(CF_3)_2PH+$ $(CF_3)_2PF$ |
| 1 | 5.598 | 1.867 | room | 4 | 0.355 | 0.092 (78%) | 1.454 | | 5.43 |
| | same | same | room | 10 | 1.628 | 0.434 (80%) | 1.864 | | 3.986 |
| | same | same | room | 17 | 1.830 | 0.491 (81%) | 1.819 | 0.030 | 3.775 |
| 2 | 4.127 | 2.403 | room | 3 | 0.139 | 0.029 (63%) | 1.937 | | --- |
| | 4.995 | 2.177 | 50 | 2 | 1.118 (67%) | 0.294 (79%) | 2.003 | | 3.818 |
| 3 | same | same | 50 | 5 | 2.277 | 0.614 (81%) | 1.839 | 0.075 | 2.680 |
| | 5.742 | 1.920 | 0 | 13 | 1.083 (57%) | 0.255 (71%) | 1.881 | | 4.675 |
| 4 | same | same | 0 | 33 | 1.701 | 0.431 (76%) | 2.027 (decreasing with time) | | 4.016 |

According to the amount of $H_2$ produced, experiment 1 was 19 percent complete after four days, 87 percent complete after 10 days, and 98 percent complete after 17 days, in terms of the equation as written. The yield of hydrogen is a suitable basis for estimating the percent yield of $[(CF_3)_2PBH_2]_3$, for a monomeric unit of this always is accompanied by one $H_2$, regardless of whether it was formed by the equation as written or by the reaction of diborane with $(CF_3)_2PH$. Accordingly, the percent yield of $[(CF_3)_2PBH_2]_3$ is given parentheses in the appropriate column of Table I. The final column gives the sum of the $(CF_3)_2PH$ and the $(CF_3)_2PF$, for these are not separable by any distillation method; only at the end of the experiment could one try to find out by chemical means whether all of the $(CF_3)_2PF$ were used up. It is possible that the secondary reaction

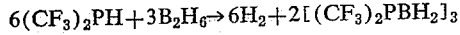
$$6(CF_3)_2PH + 3B_2H_6 \rightarrow 6H_2 + 2[(CF_3)_2PBH_2]_3$$

occurs to some extent before the main reaction is quite complete; however, in experiment 1 the sum of the $(CF_3)_2PH$ and $(CF_3)_2PF$ is so little above the expected value (3.768) for 98 percent reaction, that it may be assumed that but a slight effect due to the secondary reture of diborane by the phosphine fraction. The main reaction was only 89 percent complete after 33 days.

EXAMPLE III

A mixture of 1.132 mmols of $B_2H_6$ and 2.663 mmols of $(CF_3)_2PH$ was allowed to stand for 40 hours at 75° C., in a sealed 39 ml. Pyrex tube. During that time the diborane was only partially converted into the trimer $[(CF_3)_2PBH_2]_3$ and some non-volatile higher polymer; there was also some thermal decomposition of the diborane. The reaction yielded 0.484 mmol of hydrogen and 0.067 mmol of the trimer; 0.861 mmol of $B_2H_6$ and 2.384 mmols of $(CF_3)_2PH$ were recovered. Thus 0.279 mmol of $(CF_3)_2PH$ was converted to the polymer of $(CF_3)_2PBH_2$ evolving 0.279 mmol of hydrogen, according to the equation

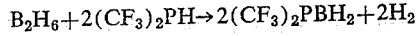
$$B_2H_6 + 2(CF_3)_2PH \rightarrow 2(CF_3)_2PBH_2 + 2H_2$$

At the same time 0.131 mmol of $B_2H_6$ presumably decomposed, producing 0.205 mmol of $H_2$ to bring the total $H_2$ to the observed 0.484 mmol. Such a yield of hydrogen would be about normal for the decomposition of diborane.

A series of additional tests were run for purposes of showing the increase in rate of the $B_2H_6$—$(CF_3)_2PF$ reaction at different temperatures. The results are set forth below in Examples IV–VI.

EXAMPLE IV

A mixture of 1.920 mmols of $B_2H_6$ and 5.742 mmols of $(CF_3)_2PF$ was allowed to stand for a period of 33 days at 0° C. The production of 1.701 mmols of $H_2$ indicated 89 percent completion. The fluorocarbonphosphine fraction now amounted to 4.016 mols (calcd., 4.041) and the yield of $[(CF_3)_2PBH_2]_3$ was 76 percent (1.293 mmols of monomer), supporting the belief that the higher polymers are favored by lower temperatures.

EXAMPLE V

In another experiment 2.403 mmols of $B_2H_6$ and 4.127 mmols of $(CF_3)_2PF$ was allowed to run for 3 days at room temperature producing 0.139 mmol of $H_2$. The actual yield of the trimer $[(CF_3)_2PBH_2]_3$ was only 63 percent of that expected; the rest was in the form of the higher polymers. The other components were separated into two distillation fractions:

(1) $BF_3$ and unused $B_2H_6$ totaling 1.937 mmols (calcd. sum, 2.403 mmols, indicating other uses of $B_2H_6$); (2) the $(CF_3)_2PH$—$(CF_3)_2PF$ mixture, containing the missing $BH_3$ units.

EXAMPLE VI

Finally, an additional test was run using a temperature of 50° C. in which $B_2H_6$ and $(CF_3)_2PF$ were reacted. Only 1.5 days were required for 46 percent completion of this reaction. By way of contrast, the 0° C. reaction was about 56 percent complete after 13 days while the room temperature reaction was only 19 percent complete after 4 days. These results are properly comparable since all conditions were comparable except temperature. It is thus seen that the higher polymers are favored by lower temperatures and higher temperatures speed the rate of formation of the trimer.

EXAMPLE VII

Further experiments on the direct reaction between $(CF_3)_2PH$ and $B_2H_6$ have indicated that elevated temperatures are required for a practicable rate of reaction; however some decomposition of diborane may interfere with good results. During six days at 0° C. (sealed tube at 3 to 4 atm.) only a trace of $H_2$ was formed, and there was no sign of the formation of any adduct such as $(CF_3)_2PH \cdot BH_3$. After six days at room temperature, the same mixture was only slightly converted to the trimer, and the reaction under similar conditions at 47° C. went several times as far in five days. Thus the reaction offers a possible method of making $$[(CF_3)_2PBH_2]_3,$$

but the $(CF_3)_2PF$ method clearly is better.

Obviously many modifications and variations of this invention may be made without departing from the spirit and scope thereof and therefore only such limitations should be imposed as are indicated in the appended claims.

We claim:

1. A process for preparing a fluoromethylphosphinoborine which comprises: contacting at between about 0° C. and 75° C. a trifluoromethylphosphine material selected from the class consisting of $(CF_3)_2PF$ and $(CF_3)_2PH$ with diborane.

2. A process for preparing a fluoromethylphosphinoborine polymer having the formula $[(CF_3)_2PBH_2]_n$ wherein $n$ is an integer in excess of two indicative of the degree of polymerization which comprises: contacting a phosphine having the general formula $(CF_3)_2PX$ wherein X is a member of the group fluorine and hydrogen with diborane at a temperature of between about 0° C. and 75° C. and allowing said materials to react.

3. The process of claim 2, wherein the reaction takes place at a temperature of between about 25° C. and about 50° C. and at a pressure of about four atmospheres to about seven atmospheres.

4. The process of claim 2 wherein the reaction takes place at about 50° C. and at a pressure of about four atmospheres.

5. A chemical compound having the general formula $$[(CF_3)_2PBH_2]_n$$

wherein $n$ is an integer in excess of two indicative of the degree of polymerization.

6. A trifluoromethylphosphinoborine polymer.

7. A chemical compound having the formula $$[(CF_3)_2PBH_2]_3.$$

8. A chemical compound having the formula $$[(CF_3)_2PBH_2]_4.$$

No references cited.